(12) United States Patent
Morarity et al.

(10) Patent No.: US 11,287,644 B2
(45) Date of Patent: Mar. 29, 2022

(54) ALTERATION OF RESONANT MODE FREQUENCY RESPONSE IN MECHANICALLY RESONANT DEVICE

(71) Applicant: Microvision, Inc., Redmond, WA (US)

(72) Inventors: Jonathan A. Morarity, Seattle, WA (US); Matthew Ellis, Sammamish, WA (US); Christopher Brian Adkins, Woodinville, WA (US)

(73) Assignee: Microvision, Inc., Redmond, WA (US)

( * ) Notice: Subject to any disclaimer, the term of this patent is extended or adjusted under 35 U.S.C. 154(b) by 520 days.

(21) Appl. No.: 16/275,409

(22) Filed: Feb. 14, 2019

(65) Prior Publication Data

US 2020/0264427 A1  Aug. 20, 2020

(51) Int. Cl.
| | | |
|---|---|---|
| *G02B 26/12* | (2006.01) | |
| *G02B 26/10* | (2006.01) | |
| *G03B 21/00* | (2006.01) | |
| *H04N 9/31* | (2006.01) | |
| *G02B 26/08* | (2006.01) | |
| *H04N 3/02* | (2006.01) | |
| *H04N 3/08* | (2006.01) | |
| *H04N 3/00* | (2006.01) | |

(52) U.S. Cl.
CPC ....... *G02B 26/122* (2013.01); *G02B 26/0833* (2013.01); *G02B 26/105* (2013.01); *G03B 21/008* (2013.01); *H04N 3/00* (2013.01); *H04N 3/02* (2013.01); *H04N 3/08* (2013.01); *H04N 9/3135* (2013.01)

(58) Field of Classification Search
CPC ............... G02B 26/122; G02B 26/105; G02B 26/0833; G02B 26/101; G02B 27/0172; H04N 3/00; H04N 3/08; H04N 3/02; H04N 9/3135; H04N 9/3147; H04N 9/3194; G03B 21/008
See application file for complete search history.

(56) References Cited

U.S. PATENT DOCUMENTS

| | | | |
|---|---|---|---|
| 7,034,370 B2 | 4/2006 | Kuo | |
| 9,677,878 B2 | 6/2017 | Shpunt et al. | |
| 2013/0194555 A1* | 8/2013 | Davis | G02B 26/105 353/98 |
| 2018/0067277 A1* | 3/2018 | Bang | H02K 41/0354 |
| 2018/0288366 A1* | 10/2018 | Adler | H04N 9/3129 |
| 2019/0212454 A1* | 7/2019 | Petit | G01S 7/48 |
| 2020/0004011 A1* | 1/2020 | Champion | G02B 26/105 |

OTHER PUBLICATIONS

Izawa, et al., "Scanning Micro-Mirror with Electostatic Spring for Compensation of Hard-Spring Nonlinearity", Micromachines 2017, 8, 240, Jan. 1, 2017, 1-13.

* cited by examiner

*Primary Examiner* — Michael E Teitelbaum
(74) *Attorney, Agent, or Firm* — Kevin D. Wills

(57) ABSTRACT

A mechanically resonant system exhibits a resonant mode frequency response. A conductor is included on a resonant member within the mechanically resonant system. A current in the conductor causes a modification of the resonant mode frequency response when in the presence of a magnetic field. The modification of the resonant mode frequency response may include an offset in the natural frequency of the mechanically resonant system.

23 Claims, 10 Drawing Sheets

ALTERATION OF RESONANT MODE FREQUENCY RESPONSE IN MECHANICALLY RESONANT DEVICE

FIELD

The present invention relates generally to mechanically resonant systems, and more specifically to the alteration of resonant modes in mechanically resonant systems.

BACKGROUND

Mechanically resonant systems typically have one (or more) modes that exhibit a natural frequency at which the system will oscillate at a maximum (or local maximum) amplitude. Many mechanically resonant systems can be driven to oscillate at a frequency different from the natural frequency, albeit with a decrease in the amplitude response.

DESCRIPTION OF EMBODIMENTS

Figure 1:
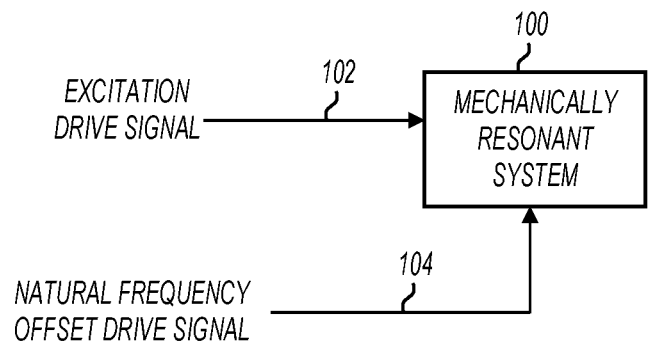
FIG. 1 shows a mechanically resonant system in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a mechanically resonant system in accordance with various embodiments of the present invention. Mechanically resonant system 100 includes a mechanically resonant member that oscillates in response to an excitation drive signal on node 102. In some embodiments, the excitation drive signal is periodic at the desired oscillation frequency of the resonant member within mechanically resonant system 100. For example, the excitation drive signal may be a sinusoidal signal, a periodic pulsed signal, or the like. In other embodiments, the excitation drive signal may include non-periodic components as well as a periodic component to excite oscillation.

Mechanically resonant system 100 may have one or more resonant modes, where each mode has a frequency response that describes, among other things, mechanical deflection amplitude as a function of the frequency of the excitation drive signal. The resonant mode frequency response of mechanically resonant system 100 includes multiple characteristics, one of which is the "natural frequency" which refers to the frequency at which the system exhibits the highest mechanical deflection amplitude.

Various embodiments of the present invention provide the ability to modify a resonant mode frequency response of the mechanically resonant system. For example, in response to the natural frequency offset drive signal on node 104, one or more natural frequencies of mechanically resonant system 100 may be offset.

Figure 2:
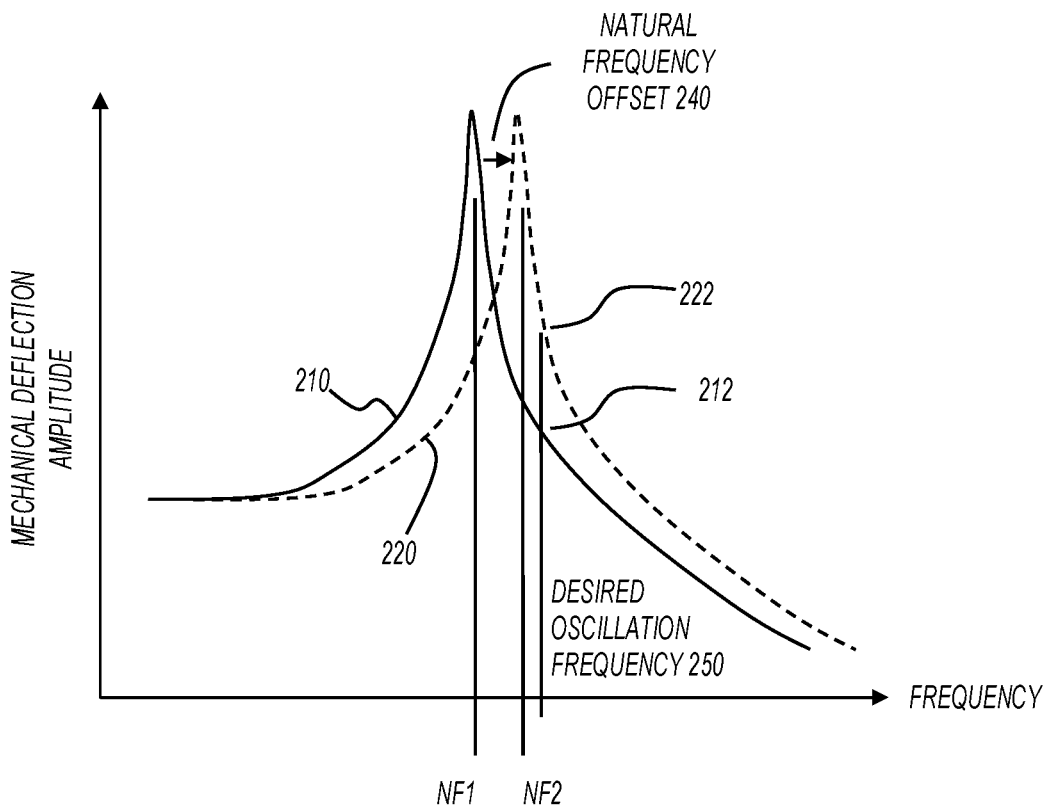
FIG. 2 shows a change in a resonant mode frequency response in accordance with various embodiments of the present invention.

FIG. 2 shows a change in a resonant mode frequency response in accordance with various embodiments of the present invention. Curve 210 represents a resonant mode frequency response of a mechanically resonant system such as mechanically resonant system 100 (FIG. 1). Curve 220 represents the resonant mode frequency response after being modified as a result of the applied natural frequency offset drive signal. In the example of FIG. 2, the resonant mode frequency response has been modified by shifting the natural frequency of the mechanically resonant system higher in frequency. More specifically, a change from the first natural frequency NF1 to a second natural frequency NF2 results in a natural frequency offset 240.

Modifying the resonant mode frequency response of a mechanically resonant system may be useful for many purposes. As an example, it may be desirable to have a mechanically resonant system oscillate at a particular frequency (shown as the desired oscillation frequency 250 in FIG. 2) that is not exactly equal to a natural frequency. When the mechanically resonant system is driven at a desired oscillation frequency different from a natural frequency, the amplitude response is lower, resulting in a lower mechanical deflection amplitude of the resonant member for a given excitation signal drive power, or an increase in the required power of the excitation drive signal to achieve a particular mechanical deflection amplitude. This is shown in FIG. 2 at operating point 212 where the mechanical deflection amplitude is reduced as compared to the mechanical deflection amplitude at the natural frequency NFL When the natural frequency is offset to NF2, the mechanical deflection amplitude at the same desired oscillation frequency 250 is increased to operating point 222, which reduces the excitation drive signal power required to achieve a given mechanical deflection amplitude.

In some embodiments, the change in the resonant mode frequency response of the mechanically resonant system is achieved by including a conductor on the resonant member, and then supplying a current in the conductor when the resonant member is in the presence of a magnetic field. In these embodiments, the natural frequency offset drive signal on node 104 takes the form of an AC or DC current or some combination. In some embodiments, the conductor may be formed into a coil having a number of turns, and the amplitude of the natural frequency offset 240 may be a function of the placement of the conductor, the number of turns in the coil, the amplitude of the natural frequency offset drive signal, and the like. Examples of mechanically resonant systems having conductors useful to modify resonant mode frequency responses are describe below with reference to later figures.

Figure 3:
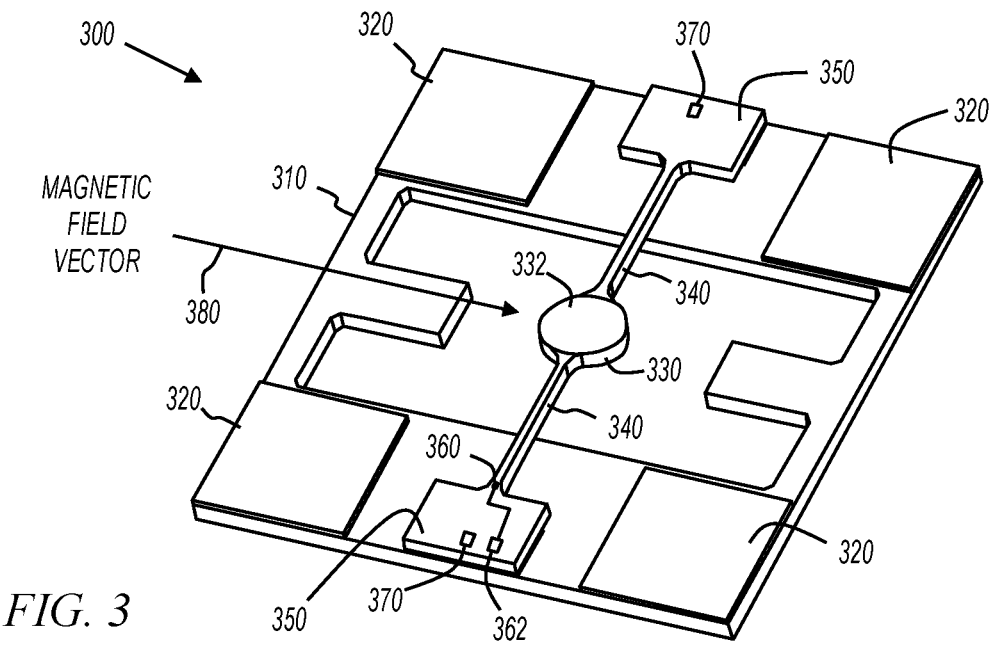
FIGS. 3 and 4 show perspective views of a mechanically resonant system in accordance with various embodiments of the present invention.

FIG. 3 shows a perspective view of a mechanically resonant system in accordance with various embodiments of the present invention. Mechanically resonant system 300 includes frame 310, actuator devices 320, and a resonant member. The resonant member includes fixed platforms 350, scanning platform 330, and flexures 340. Scanning platform 330 is coupled to fixed platforms 350 by flexures 340. Scanning platform 330 has a conductor (not shown in FIG. 3) connected to contacts 370, which are driven by a natural frequency offset drive signal (FIG. 1) to modify a resonant mode frequency response when in the presence of a magnetic field represented by magnetic field vector 380. In embodiments represented by FIG. 3, scanning platform 330 also includes scanning mirror 332.

The axis of flexures 340 forms a pivot axis. Flexures 340 are flexible members that undergo a torsional flexure, thereby allowing scanning platform 330 to rotate on the pivot axis and have an angular displacement relative to fixed platforms 350. In example embodiments represented by FIG. 3, the peak angular displacement of scanning platform 330 corresponds to the mechanical deflection amplitude shown in FIG. 2. Flexures 340 are not limited to torsional embodiments as shown in FIG. 3. For example, in some embodiments, flexures 340 take on other shapes such as arcs, "S" shapes, or other serpentine shapes.

In some embodiments, actuator devices 320 are piezoelectric devices that undergo deformation in the presence of a voltage. In some embodiments, the excitation drive signal is provided to one or more of actuator devices 320 to cause deformation of frame 310 that is periodic at the desired oscillation frequency. This deformation is transferred to fixed platforms 350 of the resonant member, which in turn causes mechanical deflection of scanning platform 330 at the desired oscillation frequency. As the desired oscillation frequency approaches the natural frequency of the resonant member, the excitation signal drive power required for a given mechanical deflection amplitude decreases. Conversely, as the desired oscillation frequency moves away from the natural frequency of the resonant member, the excitation signal drive power required for a given mechanical deflection amplitude increases.

In some embodiments, mechanically resonant system 300 includes one or more sensors to measure mechanical deflection. For example, a piezoresistive sensor 360 may be located on or near one of flexures 340. As piezoresistive sensor 360 undergoes deformation as a result of torsional forces on flexures 340, a voltage is developed that is measured at contact 362.

In some embodiments, frame 310 is composed of a conductive material, such as steel. In other embodiments, frame 310 is composed of an insulating material, or a semiconducting material. Actuator devices 320 are mechanically affixed to frame 310, as are fixed platforms 350. Actuator devices 320 and fixed platforms 350 may be mechanically affixed to frame 310 using any suitable method, including for example, mechanical adhesives, chemical adhesives, and/or other bonding methods.

Actuator devices 320 are mechanically coupled to the resonant member in such a manner that actuator devices 320 cause the resonant member to oscillate in response to an excitation signal. For example, as shown in FIG. 3, in some embodiments, actuator devices 320 and the resonant member are mechanically coupled through frame 310. In other embodiments, one or more actuator devices 320 is directly affixed to a portion of the resonant member, thereby providing a more direct mechanical coupling between the actuator device and the resonant member to cause the resonant member to oscillate in response to an excitation signal.

The resonant member (e.g., platforms 330, 350, and flexures 340) may be fabricated from a single common substrate using microelectromechanical systems (MEMS) techniques. For example, fixed platforms 350, scanning platform 330 and flexures 340 can all be formed from the same substrate. Additionally, in some embodiments, conductors and contacts can also be formed with any suitable MEMS technique. For example, any conductors and contacts can be formed by the selective deposition and patterning of conductive materials on the substrate.

Figure 4:
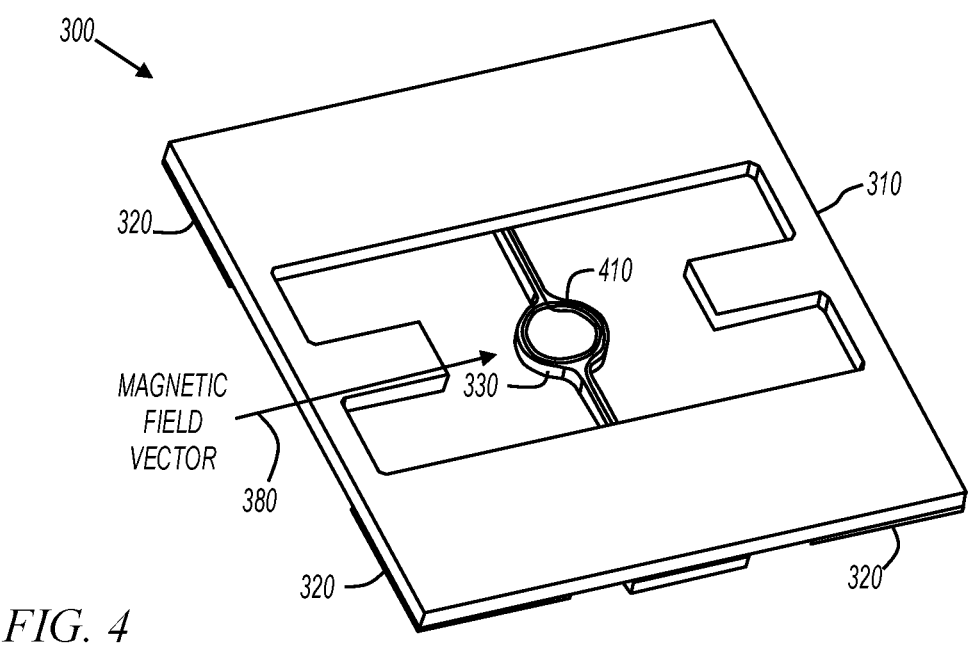

FIG. 4 shows a perspective view of a mechanically resonant system in accordance with various embodiments of the present invention. The view in FIG. 4 corresponds to the underside of mechanically resonant system 300 shown in FIG. 3. The resonant member includes a conductor 410 that is electrically coupled to contacts 370 (FIG. 3). For example, in some embodiments, a coil is formed on the underside of scanning platform 330 by a plurality of turns made by conductor 410.

In operation, an external magnetic field source (not shown) imposes a magnetic field on conductor 410. The magnetic field imposed on the drive coil by the external magnetic field source has a component in the plane of scanning platform 330 as represented by magnetic field vector 380. The in-plane current in conductor 410 interacts with the in-plane magnetic field to produce out-of-plane Lorentz forces on the conductor. In embodiments with multiple turns of conductor 410 to form a coil, the current reverses sign across the scan axis. This means the Lorentz forces also reverse sign across the scan axis, resulting in a torque in the plane of and normal to the magnetic field. These forces have the effect of modifying the resonant mode frequency response of the resonant member. In some embodiments, the modification of the resonant mode frequency response is limited to offsetting the natural frequency; however, the various embodiments of the invention are not limited in this respect. For example, in some embodiments, the overall shape of the frequency response may be modified.

In some embodiments, a natural frequency offset drive signal is driven on conductor 410 to modify the frequency response of the resonant member. For example, an alternating current (AC) signal may be driven onto conductor 410 to offset the natural frequency. In some embodiments, an AC signal that is substantially in phase with an excitation signal that drives actuator devices 320 may be driven on conductor 410, and in other embodiments, an AC signal that is substantially out of phase with an excitation signal that drives actuator devices 320 may be driven on conductor 410. In still further embodiments, an AC signal having a phase offset relative to an excitation signal that drives actuator devices 320 may be driven on conductor 410. The phase relationship between an AC signal on conductor 410 and an excitation signal that drives actuator devices 320 may be used to effect a change in the frequency response of the resonant member. For example, an in phase relationship (or small phase offset) may be used to decrease an effective torsional stiffness of the flexures, thereby imparting a reduction in an effective natural frequency of the resonant member. Similarly, an out of phase relationship (or large phase offset) may be used to increase an effective torsional stiffness of the flexures, thereby imparting an increase in an effective natural frequency of the resonant member.

In some embodiments, a direct current (DC) current signal is driven on conductor 410. For example, in some embodiments, a DC current is provided on conductor 410 to modify an angular offset of the resonant member. The DC current interacts with the externally imposed magnetic field to provide a constant force on the resonant member, resulting in the angular offset. In scanning mirror embodiments, the angular offset results in a change in the "pointing angle" about which the mirror oscillates.

Alternating current (AC) or DC signals may be driven on conductor 410 either alone or in any combination. For example, an AC signal may be driven alone to modify the frequency response without a change in angular offset, a DC current may be driven alone to modify an angular offset without a change in frequency response, or a combination of AC and DC signals may be driven to modify both the frequency response an the angular offset.

Although only one conductor 410 is shown in FIG. 4, this is not a limitation of the present invention. For example, multiple conductors may be present, each having one or more turns. In some embodiments, one conductor is driven in a manner to cause a change in the frequency response, and a second conductor is driven in a manner to cause a change in angular offset. Any combination of conductors and drive signals may be employed to effect changes in frequency response and/or angular offset without departing from the scope of the present invention.

Although FIGS. 3 and 4 show a conductor on one side of a resonant member, the various embodiments of the present invention are not limited in this respect. For example, in some embodiments, one conductor is formed on one side of a resonant member, and a second conductor is formed on a second side of the resonant member. In still further embodiments, a single conductor is formed on multiple sides of a resonant member.

Figure 5:
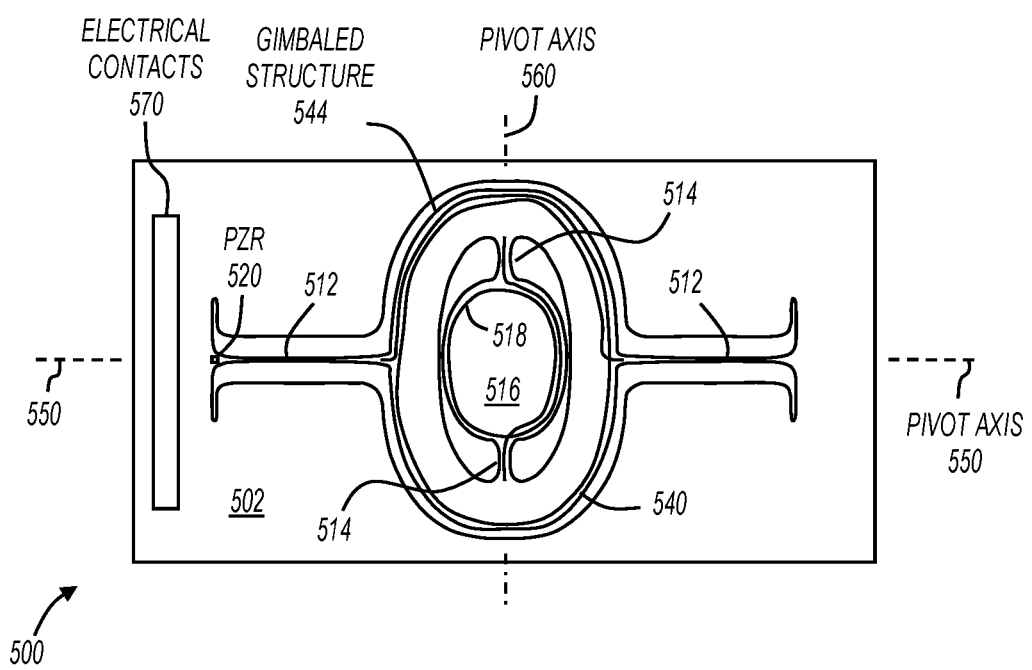
FIG. 5 shows a plan view of a mechanically resonant system in accordance with various embodiments of the present invention.

FIG. 5 shows a plan view of a mechanically resonant system in accordance with various embodiments of the present invention. Mechanically resonant system 500 is a microelectromechanical system (MEMS) device with a resonant member. Mechanically resonant system 500 includes fixed platform 502, gimbaled structure 544, scanning platform 516, and electrical contacts 570. Electrical contacts 570 may include any number and type of contacts to facilitate electrical connections between the various components of mechanically resonant system 500 and external devices.

Gimbaled structure 544 is coupled to fixed platform 502 by flexures 512, and scanning platform 516 is coupled to gimbaled structure 544 by flexures 514. The long axis of flexures 512 forms a first pivot axis 550. Flexures 512 are flexible members that undergo a torsional flexure, thereby allowing gimbaled structure 544 to rotate on pivot axis 550 and have an angular displacement relative to fixed platform 502. Flexures 512 are not limited to torsional embodiments as shown in FIG. 5. For example, in some embodiments, flexures 512 take on other shapes such as arcs, "S" shapes, or other serpentine shapes. The term "flexure" as used herein refers to any flexible member coupling a scanning platform to another platform (gimbaled or fixed), and capable of movement that allows the scanning platform to have an angular displacement with respect to the other platform.

The long axis of flexures 514 forms a second pivot axis 560. Flexures 514 are flexible members that undergo a torsional flexure, thereby allowing scanning platform 516 to rotate on pivot axis 560 and have an angular displacement relative to gimbaled structure 544. In some embodiments scanning platform 516 may also include a scanning mirror. For example, a mirror may be included on the front or back side of scanning platform 516.

Gimbaled structure 544 has a drive coil 540 connected to electrical contacts 570, which are driven by an external drive circuit, embodiments of which are described further below. In operation, gimbaled structure 544 rotates on pivot axis 550 and scanning platform 516 rotates on pivot axis 560 in response to an excitation signal present in drive coil 540. Scanning platform 516 and flexures 514 form a resonant member within mechanically resonant system 500. Drive coil 540 and gimbaled structure 544 form an actuator device that is coupled to the resonant member formed by flexures 514 and scanning platform 516. The actuator device shown in FIG. 5 is referred to herein as an "electromagnetic actuator device" in part because it utilizes electromagnetic forces to cause oscillation of the resonant member.

In operation, an external magnetic field source (not shown) imposes a magnetic field on drive coil 540. The magnetic field imposed on drive coil 540 by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on gimbaled structure 544, the current reverses sign across the pivot axes. This means the Lorentz forces also reverse sign across the pivot axes, resulting in a torque in the plane of and normal to the magnetic field. This combined torque produces separate responses by gimbaled structure 544 and scanning platform 516 depending on the frequency content of the torque. For example, the excitation drive signal within drive coil 540 may includes a first component to excite oscillation of scanning platform 516 on pivot axis 560, and may also include a second component to cause a non-oscillating motion of gimbaled structure 544 on pivot axis 550.

Mechanically resonant system 500 may also incorporate one or more integrated piezoresistive position sensors. For example, piezoresistive sensor 520 produces a voltage that represents the displacement of gimbaled structure 544 with respect to fixed platform 502. In some embodiments, a second piezoresistive sensor is placed on or near one of flexures 514 similar to piezoresistive sensor 360 (FIG. 3) to produce a voltage that represents the displacement of scanning platform 516 with respect to gimbaled structure.

Scanning platform 516 includes a conductor 518 routed to one or more contacts within electrical contacts 570, which are driven by a natural frequency offset drive signal (FIG. 1) to modify a resonant mode frequency response when in the presence of a magnetic field. For example, the resonant member formed by scanning mirror 516 and flexures 514 may exhibit a resonant mode frequency similar to curve 210 (FIG. 2). In these embodiments, the peak angular displacement of scanning platform 516 relative to gimbaled structure 544 corresponds to the mechanical deflection amplitude shown in FIG. 2. When a natural frequency offset drive signal is applied to conductor 518, the natural frequency of the resonant member may be modified as shown by curve 222 (FIG. 2).

For example, an alternating current (AC) signal may be driven onto conductor 518 to offset the natural frequency. In some embodiments, an AC signal may be driven on conductor 518 that is substantially in phase with an excitation signal driven on drive coil 540, and in other embodiments, an AC signal may be driven on conductor 518 that is substantially out of phase with an excitation signal driven on drive coil 540. In still further embodiments, an AC signal may be driven on conductor 518 that has a phase offset relative to an excitation signal driven on drive coil 540. The phase relationship between an AC signal on conductor 518 and an excitation signal driven on drive coil 540 may be used to effect a change in the frequency response of the resonant member. For example, an in phase relationship (or small phase offset) may be used to decrease an effective torsional stiffness of the flexures, thereby imparting a reduction in an effective natural frequency of the resonant member. Similarly, an out of phase relationship (or large phase offset) may be used to increase an effective torsional stiffness of the flexures, thereby imparting an increase in an effective natural frequency of the resonant member.

In some embodiments, a direct current (DC) current signal is driven on conductor 518. For example, in some embodiments, a DC current is provided on conductor 518 to modify an angular offset of the resonant member. The DC current interacts with the externally imposed magnetic field to provide a constant force on the resonant member, resulting in the angular offset. In scanning mirror embodiments, the angular offset results in a change in the "pointing angle" about which the mirror oscillates.

Alternating current (AC) or DC signals may be driven on conductor 518 either alone or in any combination. For example, an AC signal may be driven alone to modify the frequency response without a change in angular offset, a DC current may be driven alone to modify an angular offset without a change in frequency response, or a combination of AC and DC signals may be driven to modify both the frequency response an the angular offset.

Although only one conductor 518 is shown in FIG. 5, this is not a limitation of the present invention. For example, multiple conductors may be present, each having one or more turns. In some embodiments, one conductor is driven in a manner to cause a change in the frequency response, and a second conductor is driven in a manner to cause a change in angular offset. Any combination of conductors and drive signals may be employed to effect changes in frequency response and/or angular offset without departing from the scope of the present invention.

Although FIG. 5 shows a conductor on one side of a resonant member, the various embodiments of the present invention are not limited in this respect. For example, in some embodiments, one conductor is formed on one side of a resonant member, and a second conductor is formed on a second side of the resonant member. In still further embodiments, a single conductor is formed on multiple sides of a resonant member.

Figure 6:
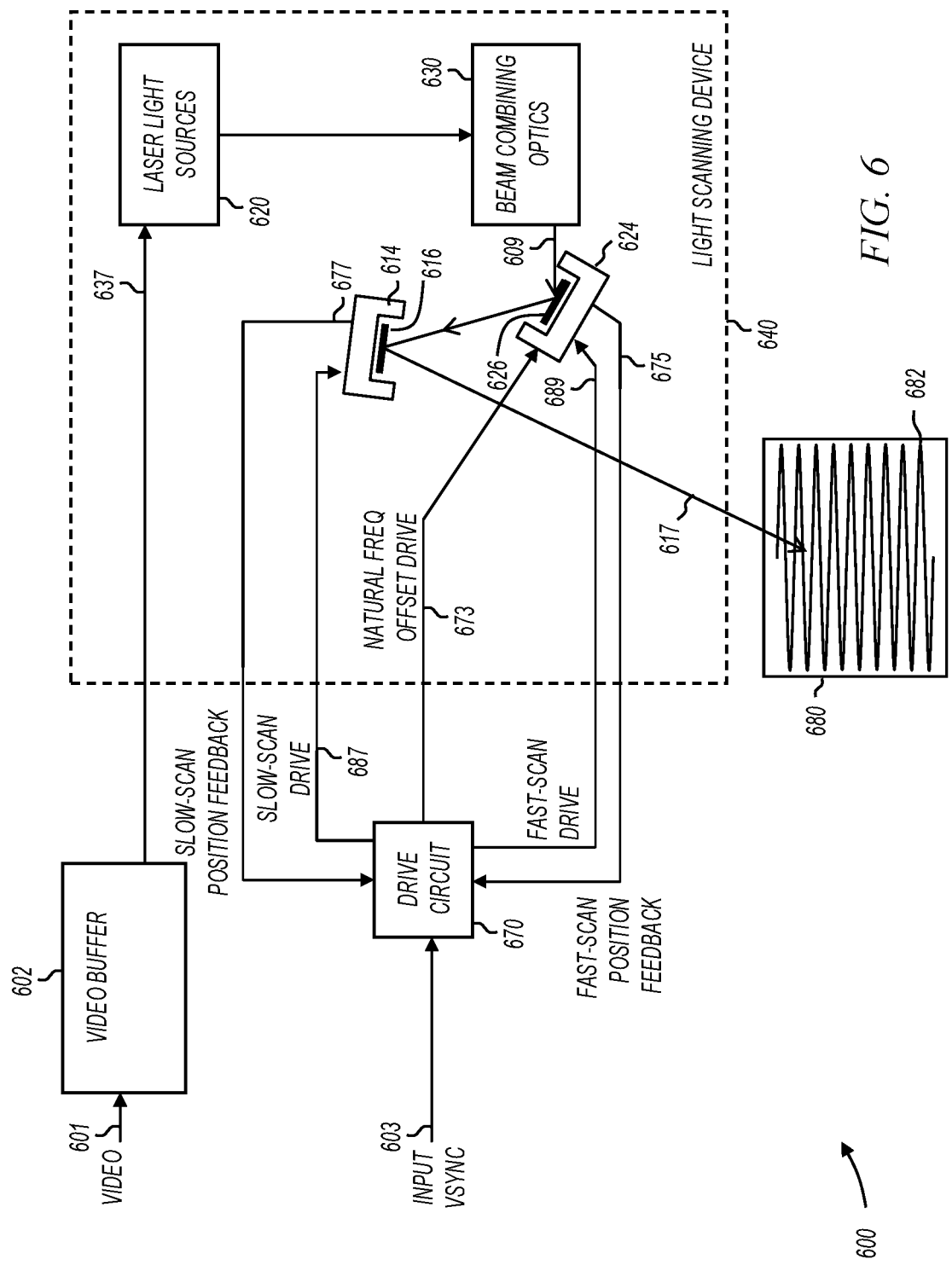
FIG. 6 shows a scanning laser projection system in accordance with various embodiments of the present invention.

FIG. 6 shows a scanning laser projection system in accordance with various embodiments of the present invention. Scanning laser projection system 600 includes video buffer 602, light scanning device 640, and drive circuit 670.

In operation, video buffer 602 stores one or more rows of video content at 601 and provides drive values on node 637 to light scanning device 640. The commanded drive values correspond to electrical currents used to drive laser light sources 620 (e.g., red, green, and blue laser diodes) such that the output intensity from the lasers is consistent with the input video content. In some embodiments, this process occurs at output pixel rates in excess of 150 MHz.

In some embodiments, the video data arrives row by row. For example, the first video data received may correspond to an upper left pixel in an image. Succeeding video data represents the remainder of the pixels in the top row from left to right, and then further rows from top to bottom. When the bottom right of the image is reached, then a complete "frame" of video data has been supplied. The rate at which frames of video data are received is referred to herein as the "frame rate." In typical applications, an input vertical sync (VSYNC) signal 603 is received with the video data and is asserted once per frame. Accordingly, the input VSYNC is periodic at the frame rate.

Light scanning device 640 includes laser light sources 620, beam combining optics 630, scanning mirror assemblies 624 and 614, and exit optics 642. In some embodiments, laser light sources 620 include at least two laser light sources that emit light of different wavelengths. For example, in some embodiments, laser light sources 620 include a first laser diode that emits red light and a second laser diode that emits green light. Also for example, in some embodiments, laser light sources 620 include a third laser diode that emits blue light. In still further embodiments, laser light sources 620 includes a fourth laser diode that emits infrared (IR) light. The terms "red," "green," and "blue" are used herein to refer to wavelengths that are perceived by a human eye as that particular color. For example, "red" refers to any wavelength of light that a human may perceive as the color red, "green" refers to any wavelength of light that a human may perceive as the color green, and "blue" refers to any wavelength of light that a human may perceive as the color blue.

Beam combining optics 630 includes one or more optic devices that combine laser light received from laser light sources 620. This combined laser beam 609 is reflected and scanned in one dimension by scanning mirror assembly 624, and then reflected and scanned in a second dimension by scanning mirror assembly 614.

Scanning mirror assembly 624 includes a mechanically resonant system. For example, in some embodiments, scanning mirror assembly 624 may include mechanically resonant system 300 (FIG. 3). A scanning mirror 626 is mounted or formed on a resonant member within scanning mirror assembly 624. An example scanning mirror and resonant member is described above with reference to FIG. 3. The pivot axis of the resonant member within assembly 624 is referred to herein as the "fast-scan axis." An excitation drive signal is provided by the fast-scan drive signal on node 689. The fast-scan drive signal may be periodic at the desired oscillation frequency of scanning mirror 626. The desired oscillation frequency may or may not be at a natural frequency of the scanning mirror.

Scanning mirror assembly 624 also receives a natural frequency offset drive signal on node 673. The natural frequency offset drive signal on node 673 provides a current in a conductor on the resonant member within scanning mirror assembly 624 to cause a change in a resonant mode frequency response. Scanning mirror assembly 624 also provides a fast-scan position feedback signal on node 675. In some embodiments, the fast-scan position feedback signal is produced by a piezoresistive sensor positioned on or near a flexure, such as piezoresistive device 360 (FIG. 3).

Scanning mirror assembly 614 includes scanning mirror 616 to scan the light beam received from scanning mirror assembly 624. An excitation drive signal is provided by the slow-scan drive signal on node 687, and scanning mirror assembly 614 provides a slow-scan position feedback signal on node 677. The pivot axis of the scanning mirror within assembly 614 is referred to herein as the "slow-scan axis." In some embodiments, scanning mirror assembly 614 includes a mechanically resonant system that has an oscillating resonant member during operation, and in other embodiments, scanning mirror assembly 614 does not oscillate during operation. For example, in some embodiments, scanning mirror 616 operates quasi-statically in a sawtooth pattern or rectangular pattern. An example scanning mirror assembly capable of operating quasi-statically is described below with reference to FIG. 7.

In some embodiments, one or both of assemblies 624 and 614 include electromagnetic actuator devices and small subassemblies of permanent magnets. In other embodiments, one or both of assemblies 624 and 614 include piezoelectric actuator devices. In still further embodiments, one or both of assemblies 624 and 614 include electrostatic actuator devices. Any type of scanner actuation may be employed without departing from the scope of the present invention.

In some embodiments, the pivot axes of the scanning mirrors in assemblies 624 and 614 are oriented orthogonally with respect to each other such that the output beam 617 scans in two dimensions (e.g., on the fast-scan axis and the slow-scan axis) to form raster scan 682 in field of view 680. In some embodiments, the slow-scan axis corresponds to the vertical axis and the fast-scan axis corresponds to the horizontal axis, although this is not a limitation of the present invention. For example, a rotation of the projector may result in the fast-scan axis being the vertical axis and the slow-scan axis being the horizontal axis Drive circuit 670 provides the slow-scan drive signal on node 687, the fast-scan drive signal on node 689, and the natural frequency offset drive signal on node 673. The fast-scan drive signal on node 689 includes an excitation signal to control the oscillating angular motion of scanning mirror 616 on the fast-scan axis, and the slow-scan drive signal on node 687 includes an excitation signal to cause scanning mirror 616 to deflect on the slow-scan axis. The resulting mirror deflection on both the fast and slow-scan axes causes output beam 617 to generate a raster scan 682 in field of view 680. In video projection operation, the laser light sources produce light pulses for each output pixel and scanning mirrors 626 and 616 reflect the light pulses as beam 617 traverses the raster pattern.

Drive circuit 670 receives the fast-scan position feedback signal from scanning mirror assembly 624 on node 675, and also receives a slow-scan position feedback signal on node 677. The fast-scan feedback signal on node 675 provides information regarding the position of scanning mirror 626 on the fast-scan axis as it oscillates at or near a natural frequency. In some embodiments, the fast-scan position feedback signal describes the instantaneous angular position of the mirror, and in other embodiments, the fast-scan position feedback signal describes the maximum deflection angle of the mirror. The slow-scan position feedback signal on node 677 provides information regarding the position of scanning mirror 616 on the slow-scan axis. In some embodiments, the slow-scan position feedback signal is used to phase lock movement on the slow-scan axis to the period of the input VSYNC signal received on node 603. In these embodiments, the frequency of movement on the slow-scan axis is dictated by a received sync signal (in this case, the input VSYNC).

In some embodiments, scanning mirror assemblies 624 and 614 include one or more analog-to-digital converters to digitize sensed position information. In these embodiments, either or both of the fast-scan position signal and the slow-scan position feedback signal are digital representations of the mirror position on the two axes. In other embodiments, the feedback signals are analog signals, and drive circuit 670 includes one or more analog-to-digital converters to digitize the feedback signals as appropriate.

Drive circuit 670 may be implemented in hardware, a programmable processor, or in any combination. For example, in some embodiments, drive circuit 670 is implemented in an application specific integrated circuit (ASIC). Further, in some embodiments, some of the faster data path control is performed in an ASIC and overall control is provided by a software programmable microprocessor. Examples of drive circuit implementations are described further below.

Figures 7A, 7B:
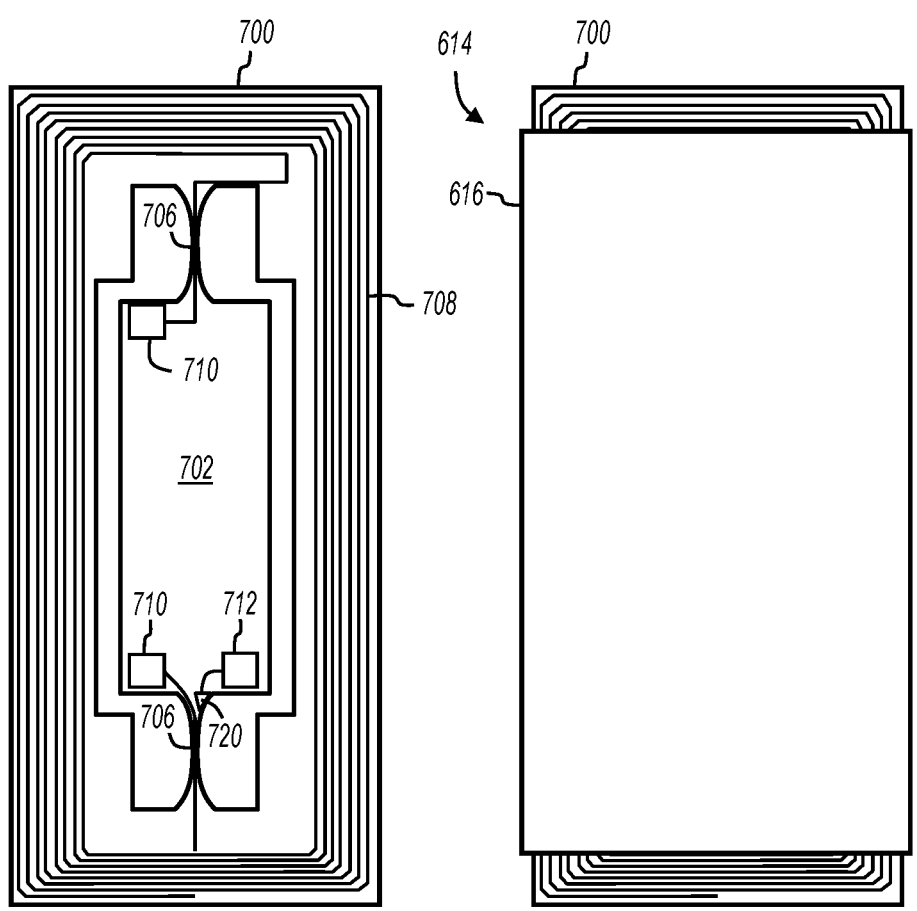
FIGS. 7A and 7B show plan views of a scanning mirror assembly in accordance with various embodiments of the present invention.

FIGS. 7A and 7B show plan views of a scanning mirror assembly in accordance with various embodiments of the present invention. Scanning mirror assembly 614 includes a stationary mount portion 702, a movable portion 700, two flexures 706, coil traces 708, and contacts 710. In operation, the movable portion 700 facilitates the motion of the attached mirror 616 to facilitate scanning in a laser scanning device.

The stationary mount portion 702 is located in a central portion of the scanning mirror assembly 614. The stationary mount portion 702 is configured to be mounted to a die carrier or other suitable device (not shown in FIG. 7) as part of the scanning mirror assembly.

The movable portion 700 substantially surrounds the stationary mount portion 702 and is coupled to the mirror 716 through attachment structures (not shown). In some embodiments, the attachment structures serve to offset the mirror 616 away from the movable portion 700. This offset of the mirror 616 away from the movable portion 700 allows the mirror 616 to rotate without impacting the stationary mount portion 702.

The movable portion 700 includes coil traces 708 while the stationary mount portion 702 includes various contacts 710 and 712. The coil traces 708 are configured to interact with applied magnetic fields and generate non-resonant or quasi-static motion. In some embodiments, coil traces 708 circumscribe the stationary mount portion 702 so that the stationary mount portion 702 is located substantially in the center of the coil traces 708; however, this is not a limitation of the present invention. In some embodiments, separate and independent coil traces on either side of the stationary mount portion 702 are used. In further embodiments, coil traces are formed on the attachment structures (not shown).

Contacts 710 and 712 provide electrical connections between the movable portion 700 and stationary portion

702. Contacts 710 provide electrical connections to coil traces 708, and contact 712 provides an electrical connection to position sensor 720.

The two flexures 706 are located on opposing sides of the stationary mount portion 702 and extend outwardly from the stationary mount portion 702 to the movable portion 700 to form a pivot axis. So configured, the two flexures 706 flexibly couple the stationary mount portion 702 to the movable portion 700 to facilitate movement of the movable portion 700 with respect to the stationary mount portion 702 along the pivot axis. Specifically, the two flexures 706 allow the movable portion 700 and the mirror 616 to rotate about the pivot axis. This rotation of the mirror 616 facilitates the use of the mirror 616 to reflect a laser beam through angular extents in a scan pattern.

During operation, drive circuit 670 (FIG. 6) provides a slow-scan drive signal to the coil trace 708 through contacts 710. The applied slow-scan drive signal creates electromagnetic interactions between the coil trace 708 and an applied magnetic field, and those interactions excite motion of the movable portion 700 and the attached mirror 616. The resulting motion of mirror 616 can be configured to reflect laser light into a pattern of scan lines, and thus can facilitate scanning laser for display and/or sensing.

Scanning mirror assembly 614 also incorporates one or more integrated piezoresistive position sensors 720. Piezoresistive sensor 720 produces a voltage that represents the displacement of mirror 616 with respect to stationary portion 702, and this voltage is provided as the slow-scan position feedback signal on node 677 (FIG. 6). In some embodiments, the slow-scan position feedback signal is provided as an analog signal. In other embodiments, the slow-scan position feedback signal is digitized using an analog-to-digital converter (not shown) such that a digital feedback signal is provided on node 677 (FIG. 6).

Much of scanning mirror assembly 614 can be fabricated from a single common substrate using MEMS techniques. Thus, the stationary mount portion 702, the movable portion 700 and the two flexures 706 can all be formed from the same substrate. Additionally, in some embodiments attachment structures can also be formed from the same substrate, while in other embodiments the attachment structures are formed separately or as part of the mirror 616. The coil traces 708 and contacts 710 and 712 can also be formed with any suitable MEMS technique. For example, the coil traces 708 and contacts 710 and 712 can be formed by the selective deposition and patterning of conductive materials on the substrate.

Figure 8:
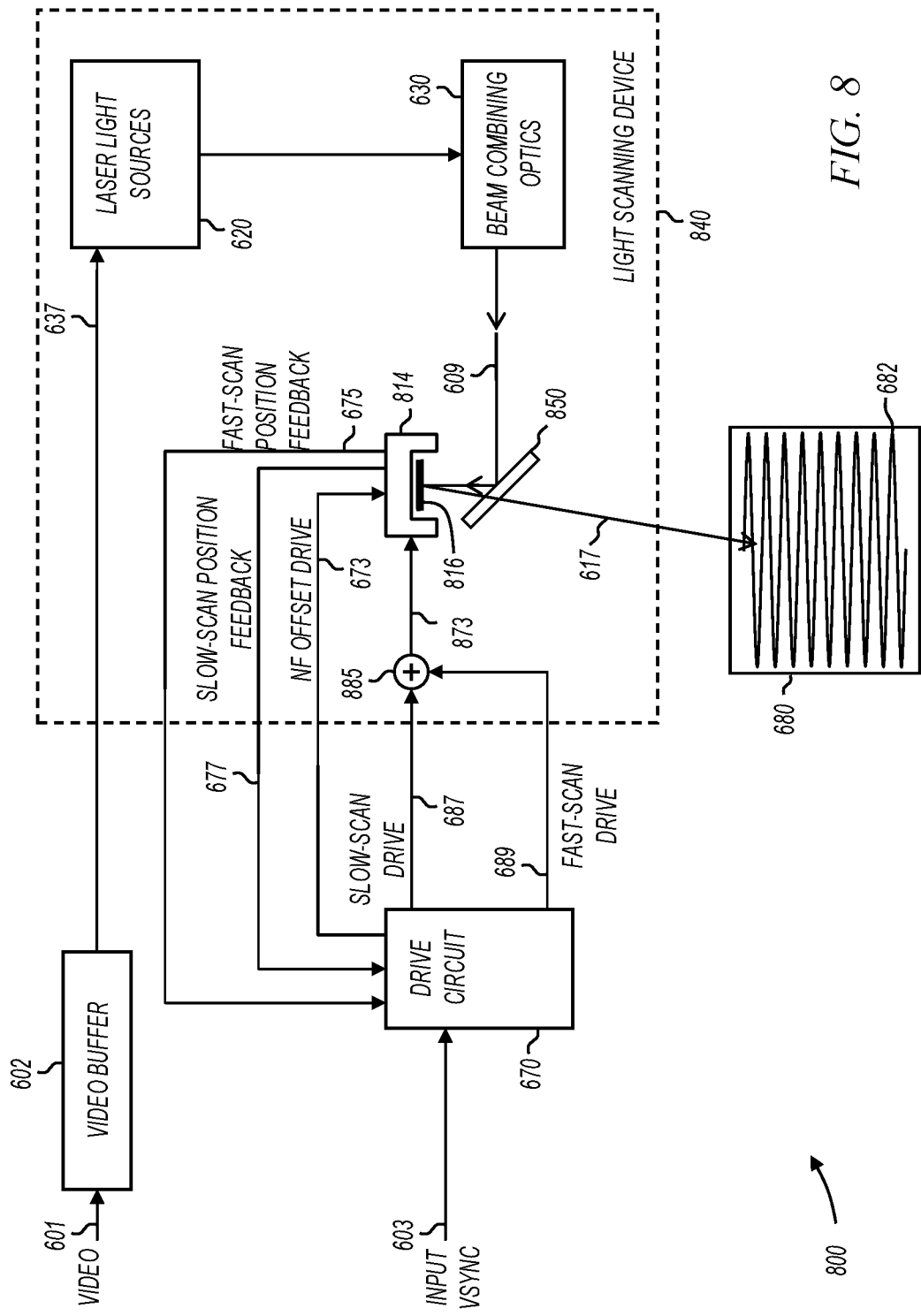
FIG. 8 shows a scanning laser projection system in accordance with various embodiments of the present invention.

FIG. 8 shows a scanning laser projection system in accordance with various embodiments of the present invention. Laser projection system 800 is similar to laser projection system 600 (FIG. 6) with the exception that the scanning engine 840 includes a single dual-axis scanning mirror assembly instead of two separate scanning mirror assemblies. Scanning mirror assembly 814 includes a mechanically resonant system. For example, in some embodiments, scanning mirror assembly 814 may include mechanically resonant system 500 (FIG. 5).

The slow-scan drive signal and the fast-scan drive signal are combined by summer 885, and the resulting drive signal on node 873 is an excitation signal used to cause a resonant member within scanning mirror assembly 814 to oscillate at or near a natural frequency, and used to cause a gimbaled structure within scanning mirror assembly to move quasi-statically.

Scanning mirror assembly 814 also receives a natural frequency offset drive signal on node 673 that is used to change a resonant mode frequency response of a resonant member within scanning mirror assembly 814. The natural frequency offset drive signal drives a current through a conductor on a resonant member that causes an offset in the natural frequency of the resonant member when in the presence of a magnetic field. Scanning mirror assembly also provides a fast-scan position feedback signal on node 675 and a slow-scan position feedback signal on node 677.

Figure 9:
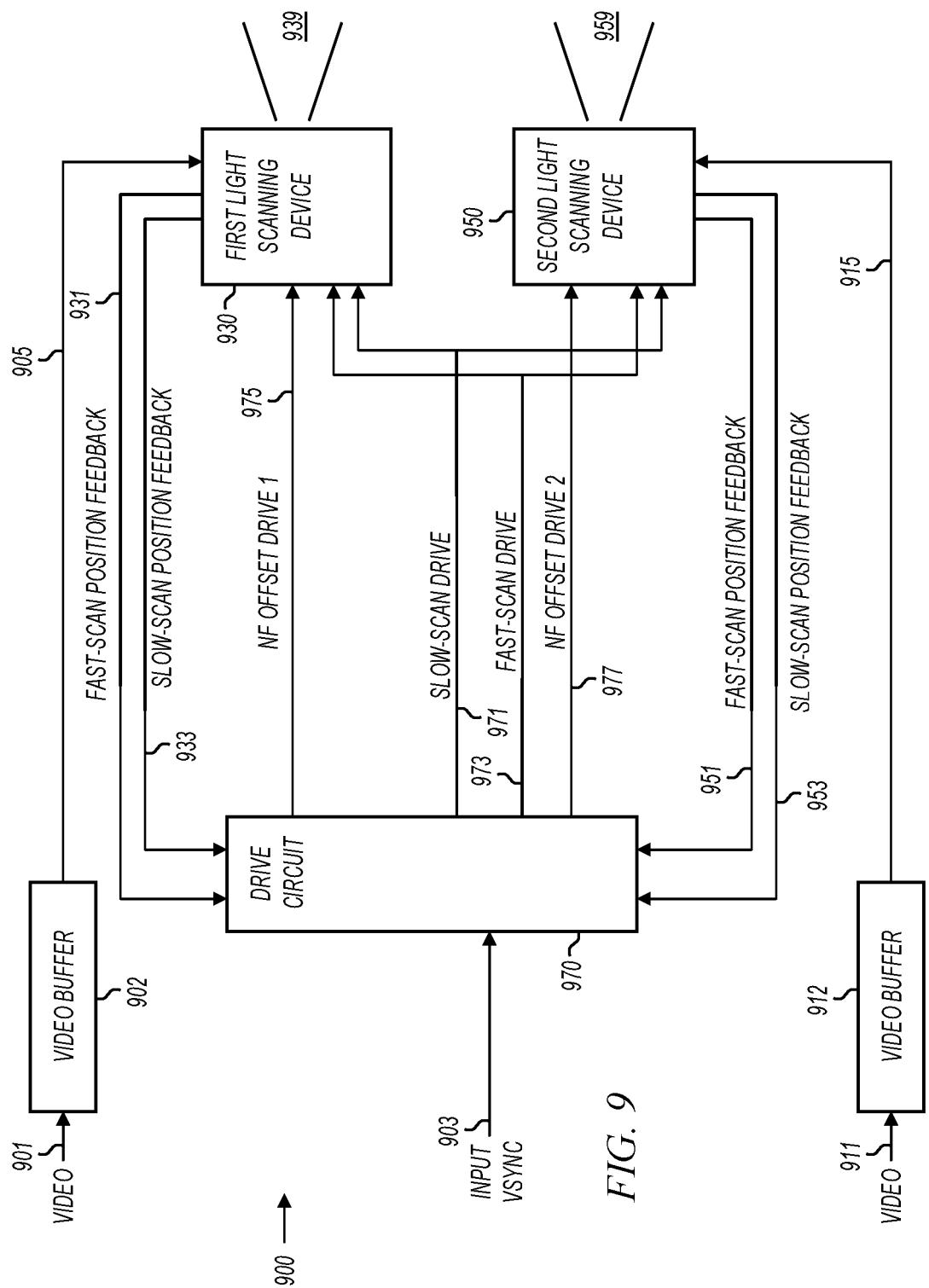
FIG. 9 shows a scanning laser projection system with synchronized scanners in accordance with various embodiments of the present invention.

FIG. 9 shows a scanning laser projection system with synchronized scanners in accordance with various embodiments of the present invention. Scanning laser projection system 900 includes video buffers 902 and 912, drive circuit 970, first light scanning device 930, and second light scanning device 950.

Video buffers 902 and 912 buffer video received from video streams 901 and 911, respectively. In some embodiments, video streams 901 and 911 include identical information, and in other embodiments, video streams 901 and 911 include different information. For example, video streams 901 and 911 may include different content and scanning laser projection system 900 may project the different content into fields of view 939 and 959 in an augmented reality or virtual reality application. In some embodiments, content may also be projected into partitioned or overlapping fields of view to form a tiled or interactive display. Video content may correspond to red, green, and blue laser channels, or one or more infrared wavelengths, or the like.

First and second light scanning devices 930 and 950 each include at least one mechanical resonant system to scan light on at least one axis. For example, either or both of light scanning devices 930 and 950 may be implemented as light scanning device 640 (FIG. 6), light scanning device 840 (FIG. 8), or the like. In some embodiments, either or both of light scanning devices 930 and 950 include a single axis scanning mirror assembly such as that shown in FIGS. 3 and 4, and in other embodiments, either or both of light scanning devices 930 and 950 include a dual axis scanning mirror assembly such as that shown in FIG. 5.

First light scanning device 930 provides a fast-scan position feedback signal on node 931 and a slow-scan position feedback signal on node 933. Similarly, second light scanning device 950 provides a fast-scan position feedback signal on node 951 and a slow-scan position feedback signal on node 953.

Drive circuit 970 provides a slow-scan drive signal on node 971 to both light scanning devices to synchronize movement on the slow-scan axis in both light scanning devices. Drive circuit 970 also provides a fast-scan drive signal on node 973 to both light scanning devices as an excitation signal to cause mechanically resonant scanning mirrors in both first light scanning device 930 and second light scanning device 950 to oscillate at a common frequency. First and second light scanning devices 930 and 950 are referred to herein as being synchronized, in part because resonant scanning mirrors within each light scanning device are driven to oscillate at a common frequency. In some embodiments, the frequency of the fast-scan drive signal is not at a natural frequency of resonant members within either of the light scanning devices.

Drive circuit 970 provides a natural frequency offset drive signal on node 975 to first light scanning device 930 to alter a resonant mode frequency response of a resonant member within light scanning device 930. Drive circuit 970 also provides a natural frequency offset drive signal on node 977 to second light scanning device 950 to alter a resonant mode frequency response of a resonant member within light scanning device 950.

In some embodiments, the natural frequency of only one of the resonant members within light scanning devices 930 and 950 is modified. For example, referring now to FIG. 10, curve 1014 may correspond to a resonant mode frequency response of a resonant scanning mirror within second light scanning device 950, and curve 1010 may correspond to a resonant mode frequency response of a resonant scanning mirror within first light scanning device 930. In response to a natural frequency offset drive signal driven on node 977 by drive circuit 970, the natural frequency of the resonant scanning mirror within second light scanning device 950 may be offset as shown at 1040 resulting in a modified frequency response represented by curve 1012.

Figure 10:
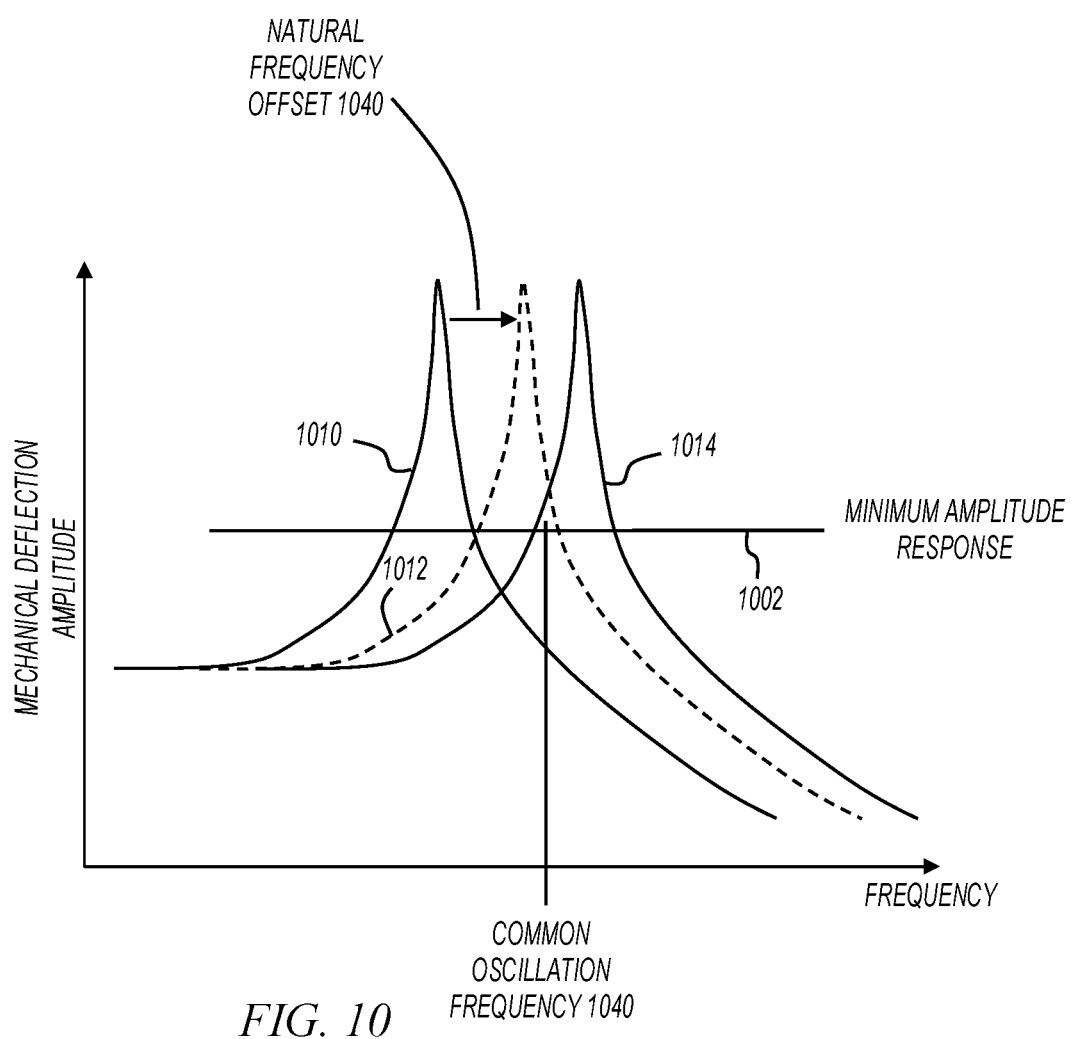
FIG. 10 shows a change in a resonant mode frequency response in accordance with various embodiments of the present invention.

Changing the natural frequency of one resonant scanning mirror to be closer in frequency to a natural frequency of another resonant scanning mirror may be useful for many reasons. For example, in some embodiments, a minimum amplitude response may be required of each resonant scanning mirror in order to achieve the mechanical deflection amplitude necessary to fill a particular field of view. An example minimum amplitude response is shown in FIG. 10 at 1002. Unmodified, the resonant mode frequency responses represented by curves 1010 and 1014 do not overlap sufficiently to provide a common oscillation frequency that allows both resonant scanning mirrors to operate above the minimum amplitude response. By moving the natural frequency of one resonant scanning mirror closer in frequency to the natural frequency of the second scanning mirror, both mirrors can be excited at a common oscillation frequency 1040 that results in both resonant scanning mirrors having a mechanical deflection amplitude that is above the minimum amplitude response.

In some embodiments, light scanning devices 930 and 950 are driven by separate fast-scan drive signals to allow independent control of the phase of each light scanning device. For example, in some embodiments, light scanning devices 930 and 950 are driven by independent fast-scan drive signals to cause oscillation at a common frequency as well as a common phase. Also for example, in some embodiments, light scanning devices 930 and 950 are driven by independent fast-scan drive signals to cause oscillation at a common frequency with a phase offset. In operation of these embodiments, drive circuit 970 phase locks the fast-scan drive signals with the fast-scan position feedback signals such that both of the light scanning devices oscillate with a common phase and a desired phase relationship. In some embodiments, operation at a common frequency and phase may be useful for aligning projection content in fields of view 939 and 959 both temporally and spatially.

Figure 11:
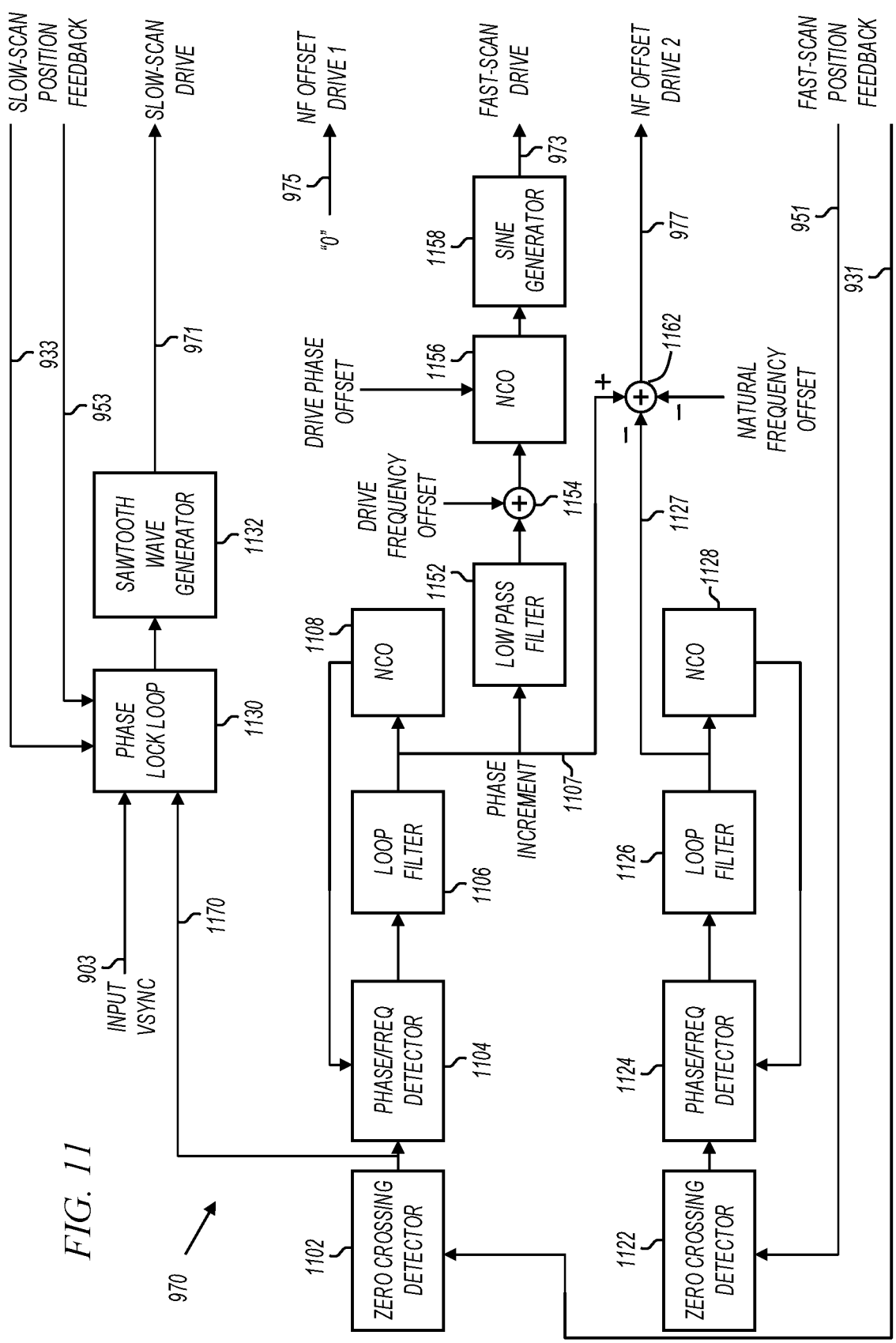
FIG. 11 shows a drive circuit in accordance with various embodiments of the present invention.

FIG. 11 shows a drive circuit in accordance with various embodiments of the present invention. Drive circuit 970 is an example drive circuit capable of synchronizing two resonant scanning mirrors. The various embodiments of the invention are not limited to the specific drive circuit implementation shown, as many different variations in drive circuitry are possible that are capable of achieving the desired result. For example, a suitable drive circuit may force one or both scanning mirrors to operate at mechanical resonance while modifying the mechanical resonance of either or both of the scanning mirrors. In other embodiments, a suitable drive circuit may modify the mechanical resonance of one scanning mirror while operating both scanning mirrors at a desired operating frequency.

Drive circuit 970 includes a first phase lock loop (PLL) that includes zero crossing detector 1102, phase/frequency detector 1104, loop filter 1106, and numerically controlled oscillator (NCO) 1108. This first PLL tracks the oscillation frequency of the resonant scanning mirror within light scanning device 930. In some embodiments, phase/frequency optimization loops minimize drive energy to hold oscillation on mechanical resonance. The fast-scan drive signal on node 973 is derived from the first PLL, and is at the same frequency subject to any modifications made by a drive frequency offset summed in at 1154. A phase increment on node 1107 from the first PLL is low pass filtered at 1152, summed with any additional phase value at 1154 to offset the resulting drive frequency, and the resulting phase value is input to NCO 1156. NCO adds in a phase offset and produces a changing phase value that represents the frequency and phase of the fast-scan drive signal. The sign generator 1158 converts the phase value to a sine wave that is ultimately used to excite resonant motion of the resonant scanning mirrors.

Drive circuit 970 includes a second PLL that includes zero crossing detector 1122, phase/frequency detector 1124, loop filter 1126, and NCO 1128. This second PLL tracks the oscillation frequency of the resonant scanning mirror within light scanning device 950. In some embodiments, phase/frequency optimization loops minimize drive energy to hold oscillation on mechanical resonance. The difference between the phase increment from the first PLL (on node 1107) and the phase increment from the second PLL (on node 1127) is summed at 1162 with a phase value that represents the desired natural frequency offset to be applied to the resonant scanning mirror within light scanning device 950. The result is the natural frequency offset drive signal provided on node 977 to light scanning device 950. In embodiments represented by FIG. 11, the natural frequency offset drive signal provided to light scanning device 930 on node 975 has a zero value, resulting in no modification of the resonant mode frequency response for the resonant scanning mirror within light scanning device 930. This corresponds to the operation described with reference to FIG. 10, but is not a limitation of the present invention. For example, in some embodiments, the natural frequency offset drive signal on node 975 has a non-zero value resulting in a modification of the resonant mode frequency response of the resonant scanning mirror within light scanning device 930.

Drive circuit 970 also includes PLL 1130 and sawtooth wave generator 1132 to produce the slow-scan drive signal on node 971. In operation, PLL 1130 receives the slow-scan position feedback on nodes 933 and 953, locks the frequency of the slow-scan drive signal to the input VSYNC on node 903, and locks the phase of the slow-scan drive signal to the phase of the fast scan drive using the output of zero crossing detector 1102 on node 1170. In some instances, fast-scan resonance can be shifted to yield an integer ratio between slow-scan and fast-scan periods to yield a time-synchronized and scan angle-stabilized two dimensional field of view.

Figure 12:
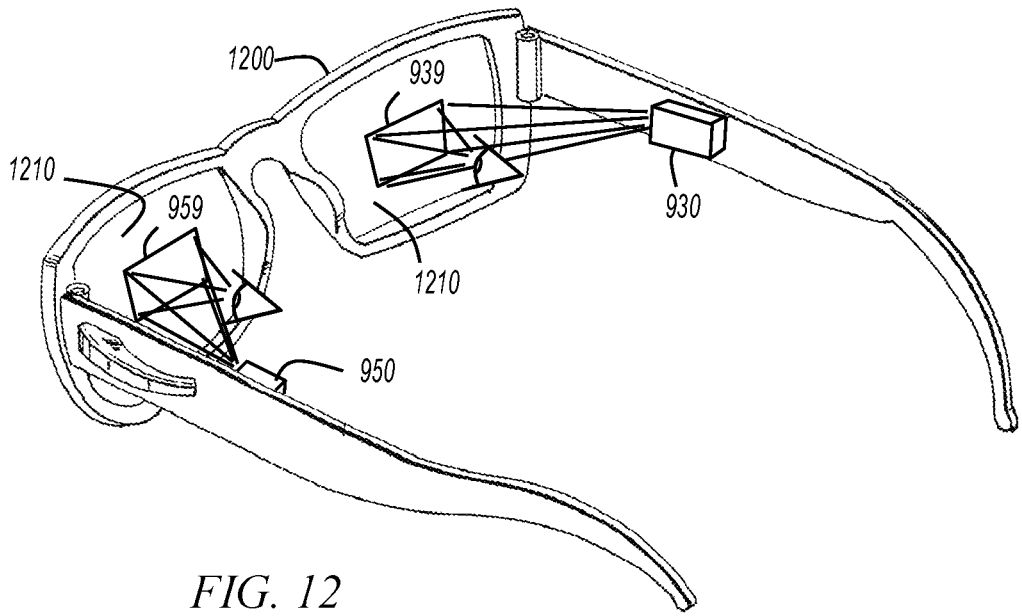
FIG. 12 shows a display system with synchronized scanners in accordance with various embodiments of the present invention.

FIG. 12 shows a display system with synchronized scanners in accordance with various embodiments of the present invention. A pair of glasses includes lenses 1210. Light scanning device 930 projects content into field of view 939 and light scanning device 950 projects content into field of view 959. The mechanically resonant systems within light scanning devices 930 and 950 are synchronized as described above. In addition a resonant mode frequency response may be modified within one or both of light scanning devices 930 or 950. For example, a natural frequency of a resonant scanning mirror within light scanning device 950 may be moved in frequency closer to a natural frequency of a resonant scanning mirror within light scanning device 930. The resonant mode frequency response of a resonant scanning mirror within one or both of light scanning devices 930 and 950 may be modified by providing a current in a conductor on the resonant scanning mirror when in the presence of a magnetic field.

Display system 1200 is shown in FIG. 12 in the form of an augmented reality headset. In some embodiments, display system 1200 is in the form of a virtual reality headset. In some embodiments, light scanning device 930 projects content that is visible to a user's right eye, and light scanning device 950 projects content that is visible to the user's left eye, and resonant scanning mirrors within light scanning devices 930 and 950 are matched in frequency and phase for the purpose of spatially and temporally aligning laser content visible to both left and right eyes.

In other embodiments, display system 1200 is in the form of a short throw or wall mode display with overlapping or tiled content which may or may not contain both visible and/or IR fields.

Figure 13:
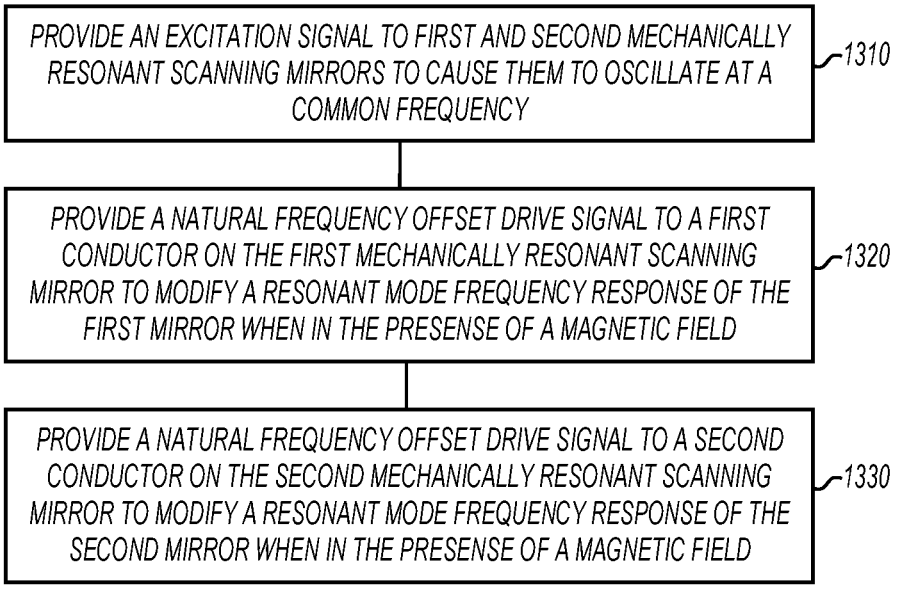
FIG. 13 shows a flow diagram of methods in accordance with various embodiments of the present invention.

FIG. 13 shows a flow diagram of methods in accordance with various embodiments of the present invention. In some embodiments, method 1300, or portions thereof, is performed by a scanning laser projection system. In other embodiments, method 1300 is performed by a drive circuit and a mechanically resonant system. Method 1300 is not limited by the particular type of apparatus performing the method. The various actions in method 1300 may be performed in the order presented, or may be performed in a different order. Further, in some embodiments, some actions listed in FIG. 13 are omitted from method 1300.

Method 1300 is shown beginning with block 1310. As shown at 1310, an excitation signal is provided to first and second mechanically resonant scanning mirrors to cause them to oscillate at a common frequency or at their nominal natural frequencies. In some embodiments, the common frequency is equal to a natural frequency of one of the first and second mechanically resonant scanning mirrors, and in other embodiments, the common frequency is not equal to the natural frequency of either of first and second mechanically resonant scanning mirrors.

An example of the operations of 1310 is shown in FIGS. 9 and 11, where the fast-scan drive signal on node 973 is used to drive resonant scanning mirrors within both first light scanning device 930 and second light scanning device 950. In some embodiments, the excitation signal is provided to a piezoelectric actuator device as described above with reference to FIG. 3. In other embodiments, the excitation signal is provided to an electromagnetic actuator device as described above with reference to FIG. 5.

In some embodiments, the actions of 1310 include providing excitation signals to the first and second mechanically resonant scanning mirrors to cause the first and second mechanically resonant scanning mirrors to oscillate at a common frequency and a phase relationship such that the first and second mechanically resonant scanning mirrors are synchronized both in time and angular position.

At 1320, a natural frequency offset drive signal is provided to a first conductor on the first mechanically resonant scanning mirror to modify a resonant mode frequency response of the first mirror when in the presence of a magnetic field. In some embodiments, this corresponds to the operation of drive circuit 970 providing a non-zero valued signal to first light scanning device 930 (FIG. 9). The natural frequency offset drive signal may take any form. For example, in some embodiments, the natural frequency offset drive signal may be an AC signal having a defined phase relationship with the excitation signal. A natural frequency offset drive signal having an in phase relationship (or small phase offset) with the excitation signal may have the effect of reducing the effective natural frequency of the first mirror. Similarly, a natural frequency offset drive signal having an out of phase relationship (or large phase offset) with the excitation signal may have the effect of increasing the effective natural frequency of the first mirror.

At 1330, a natural frequency offset drive signal is provided to a second conductor on the second mechanically resonant scanning mirror to modify a resonant mode frequency response of the second mirror when in the presence of a magnetic field. In some embodiments, this corresponds to the operation of drive circuit 970 providing a non-zero valued signal to second light scanning device 950 (FIG. 9). The natural frequency offset drive signal may take any form. For example, in some embodiments, the natural frequency offset drive signal may be an AC signal having a defined phase relationship with the excitation signal. A natural frequency offset drive signal having an in phase relationship (or small phase offset) with the excitation signal may have the effect of reducing the effective natural frequency of the second mirror. Similarly, a natural frequency offset drive signal having an out of phase relationship (or large phase offset) with the excitation signal may have the effect of increasing the effective natural frequency of the second mirror.

In some embodiments, the natural frequency offset drive signals may include a direct current (DC) current signal. For example, in some embodiments, a DC current is provided to modify an angular offset of one or both scanning mirrors. The DC current interacts with the externally imposed magnetic field to provide a constant force on the scanning mirror, resulting in the angular offset. The angular offset results in a change in the "pointing angle" about which the mirror oscillates.

Alternating current (AC) or DC signals may be driven either alone or in any combination. For example, an AC signal may be driven alone to modify the frequency response without a change in angular offset, a DC current may be driven alone to modify an angular offset without a change in frequency response, or a combination of AC and DC signals may be driven to modify both the frequency response an the angular offset.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
   a first scanning mirror assembly having a first mechanically resonant scanning mirror and a first actuator device, wherein the first mechanically resonant scanning mirror includes a first conductor thereupon, that when carrying a current in the presence of a magnetic field causes a change in a resonant mode frequency response of the first mechanically resonant scanning mirror;
   a second scanning mirror assembly having a second mechanically resonant scanning mirror and a second actuator device; and
   a drive circuit to provide an excitation signal to the first and second actuator devices to cause the first and second mechanically resonant scanning mirrors to oscillate at a common frequency, and to provide a first resonant mode offset signal to the first conductor on the first mechanically resonant scanning mirror to modify the resonant mode frequency response of the first mechanically resonant scanning mirror, where the first resonant mode offset signal comprises an alternating current (AC) signal.

2. The apparatus of claim 1 further comprising:
at least one first laser light source to create laser light pulses to be reflected by the first mechanically resonant scanning mirror; and
at least one second laser light source to create laser light pulses to be reflected by the second mechanically resonant scanning mirror.

3. The apparatus of claim 1 wherein the second mechanically resonant scanning mirror includes a second conductor thereupon, that when carrying a current in the presence of a magnetic field causes a change in a resonant mode frequency response of the second mechanically resonant scanning mirror.

4. The apparatus of claim 3 wherein the drive circuit is configured to provide a second resonant mode offset signal to the second conductor on the second mechanically resonant scanning mirror to modify a resonant mode frequency response of the second mechanically resonant scanning mirror.

5. The apparatus of claim 1 wherein the first and second actuator devices comprise piezoelectric actuator devices.

6. The apparatus of claim 1 wherein the first and second mechanically resonant scanning mirrors are single axis mirrors.

7. The apparatus of claim 1 wherein the first and second mechanically resonant scanning mirrors are dual axis mirrors.

8. A method comprising:
providing an excitation signal to first and second mechanically resonant scanning mirrors to cause the first and second mechanically resonant scanning mirrors to oscillate at a common frequency; and
providing a natural frequency offset drive signal to a first conductor on the first mechanically resonant scanning mirror to modify a resonant mode frequency response of the first mechanically resonant scanning mirror when the first mechanically resonant scanning mirror is in the presence of a magnetic field, where the natural frequency offset signal comprises an alternating current (AC) signal.

9. The method of claim 8 wherein providing a natural frequency offset drive signal comprises providing a natural frequency offset drive signal to move a natural frequency of the first mechanically resonant scanning mirror closer in frequency to a natural frequency of the second mechanically resonant scanning mirror.

10. The method of claim 8 wherein providing an excitation signal to first and second mechanically resonant scanning mirrors to cause the first and second mechanically resonant scanning mirrors to oscillate at a common frequency comprises providing an excitation signal to a piezoelectric actuator device.

11. The method of claim 8 wherein providing an excitation signal to first and second mechanically resonant scanning mirrors to cause the first and second mechanically resonant scanning mirrors to oscillate at a common frequency comprises providing an excitation signal to an electromagnetic actuator device.

12. The method of claim 8 further comprising providing a natural frequency offset drive signal to a second conductor on the second mechanically resonant scanning mirror to modify a resonant mode frequency response of the second mechanically resonant scanning mirror when the second mechanically resonant scanning mirror is in the presence of a magnetic field.

13. The method of claim 8 wherein the alternating current (AC) signal is in phase with the excitation signal.

14. The method of claim 8 wherein the alternating current (AC) signal is out of phase with the excitation signal.

15. The method of claim 12 further comprising providing a direct current (DC) signal to the first second conductor to modify an angular offset of the second mechanically resonant scanning mirror.

16. The method of claim 8 further comprising providing a direct current (DC) signal to the first conductor to modify an angular offset of the first mechanically resonant scanning mirror.

17. The method of claim 8 wherein providing an excitation signal to first and second mechanically resonant scanning mirrors to cause the first and second mechanically resonant scanning mirrors to oscillate at a common frequency comprises providing excitation signals to the first and second mechanically resonant scanning mirrors to cause the first and second mechanically resonant scanning mirrors to oscillate at a common frequency and a phase relationship such that the first and second mechanically resonant scanning mirrors are synchronized both in time and angular position.

18. An apparatus comprising:
a first scanning mirror assembly having a first mechanically resonant scanning mirror and a first actuator device, wherein the first mechanically resonant scanning mirror includes a first conductor thereupon, that when carrying a current in the presence of a magnetic field causes a change in a resonant mode frequency response of the first mechanically resonant scanning mirror;
a second scanning mirror assembly having a second mechanically resonant scanning mirror and a second actuator device;
a drive circuit to provide an excitation signal to the first and second actuator devices, where the excitation signal is configured to drive the first mechanically resonant scanning mirror to oscillate at first frequency and drive the second mechanically resonant scanning mirror to oscillate at a second frequency, and wherein the drive circuit further provides a first natural frequency offset signal to the first conductor on the first mechanically resonant scanning mirror to modify the resonant mode frequency response of the first mechanically resonant scanning mirror, where the natural frequency offset signal comprises an alternating current (AC) signal that causes the first mechanically resonant scanning mirror to oscillate at a third frequency different than the first frequency and closer to the second frequency when driven by the excitation signal.

19. The apparatus of claim 18 wherein the second mechanically resonant scanning mirror includes a second conductor thereupon, and wherein the drive circuit further provides a second natural frequency offset signal to the second conductor on the second mechanically resonant scanning mirror to modify the resonant mode frequency response of the second mechanically resonant scanning mirror and cause the second mechanically resonant scanning mirror to oscillate at a fourth frequency different than the second frequency when driven by the excitation signal.

20. The apparatus of claim 19 wherein the first natural frequency offset signal and the second natural frequency offset signal are such that the first and second mechanically resonant scanning mirrors have a frequency and phase relationship such that the first and second mechanically resonant scanning mirrors are synchronized both in time and angular position.

21. The apparatus of claim 18 wherein the alternating current (AC) signal is in phase with the excitation signal.

22. The apparatus of claim 18 wherein the alternating current (AC) signal out of phase with the excitation signal.

23. The apparatus of claim 18 wherein the drive circuit further provides a direct current (DC) signal to the first conductor to modify an angular offset of the first mechanically resonant scanning mirror.

* * * * *